US008405046B2

(12) United States Patent
NeCamp (10) Patent No.: US 8,405,046 B2
(45) Date of Patent: Mar. 26, 2013

(54) METHOD AND APPARATUS FOR TREATING MATERIALS USING ELECTRODELESS LAMPS

(76) Inventor: David Richard NeCamp, Loveland, OH (US)

( * ) Notice: Subject to any disclaimer, the term of this patent is extended or adjusted under 35 U.S.C. 154(b) by 0 days.

(21) Appl. No.: 13/169,013

(22) Filed: Jun. 26, 2011

(65) Prior Publication Data
US 2011/0253904 A1  Oct. 20, 2011

Related U.S. Application Data

(63) Continuation-in-part of application No. 11/789,587, filed on Apr. 25, 2007, now Pat. No. 7,993,528.

(51) Int. Cl.
*A61L 2/10* (2006.01)
*G01N 23/12* (2006.01)

(52) U.S. Cl. ............... 250/436; 250/432 R; 210/748.01; 210/748.1; 210/748.11; 422/24; 422/186; 422/186.01; 422/186.03; 422/186.12; 422/186.02; 422/186.04; 315/248

(58) Field of Classification Search .. 210/748.01–748.1, 210/748.11; 422/186.3, 186, 20, 21, 22, 422/23, 24, 186.01, 186.03, 186.04, 186.12, 422/186.02; 250/436, 432 R; 315/248
See application file for complete search history.

(56) References Cited

U.S. PATENT DOCUMENTS

| 1,969,655 | A | * | 8/1934 | Mailey .................... 204/157.4 |
| 5,194,740 | A | * | 3/1993 | Kogelschatz et al. ...... 250/492.1 |
| 5,834,784 | A | * | 11/1998 | Morgan et al. ................. 250/436 |
| 6,177,763 | B1 | * | 1/2001 | Morrow ........................ 313/607 |
| 6,404,141 | B1 | * | 6/2002 | Miyazaki et al. ............. 315/248 |
| 2005/0264215 | A1 | | 12/2005 | Briggs et al. |
| 2010/0060138 | A1 | * | 3/2010 | Hilbig et al. .................. 313/485 |

FOREIGN PATENT DOCUMENTS

| GB | 2 399 216 A | 9/2004 |
| JP | 10 012197 A | 1/1998 |
| JP | 2007 059081 A | 3/2007 |
| WO | WO 2007000723 A2 * | 1/2007 |

* cited by examiner

*Primary Examiner* — Joseph Drodge
*Assistant Examiner* — Cameron J Allen
(74) *Attorney, Agent, or Firm* — Porter, Wright, Morris & Arthur, LLP (57) ABSTRACT

The output wavelengths of an electrodeless lamp are controlled by passing a fluid over the surface of the lamp to control its temperature. The stabilized temperature prevents thermal runaway of the lamp and stabilizes the output wavelengths of the lamp. When the fluid passing over the lamp is water, the lamp can be used for sanitary treatment of the water. Lamp radiation can be enhanced by shaping the electrodeless lamp to provide maximally effective photonic output.

18 Claims, 8 Drawing Sheets

FIG. 9

METHOD AND APPARATUS FOR TREATING MATERIALS USING ELECTRODELESS LAMPS

This is a continuation-in-part of non-provisional Application No. 11/789,587 filed Apr. 25, 2007 now U.S. Pat. No. 7,993,528.

BACKGROUND OF THE INVENTION

Electrodeless lamps can provide advantages over electrode lamps. The electrodeless lamps require no electrical connections, can be energized without direct mechanical contact to the lamps, and can be energized by the field action of remote radio frequency optical stimulation, or even magnetic fields. Instead of using electrical current passing through electrodes to excite an electrodeless lamp for producing light, in most cases radio frequency energy is induced through a quartz glass envelope to excite the gas in the lamp and cause it to emit photonic radiation. Primarily used in ultraviolet curing applications where power and speed are requirements, this lamp technology offers significant benefits in other applications as well.

Electrodeless lamps can be run at much higher power levels than electrode lamps allowing them to produce much greater amounts of ultraviolet light than their electrode counterparts. Electrodeless lamps exhibit long life spans on the order of 20,000 hours and, theoretically, can last much longer than that. They are very sturdy and withstand both mechanical and thermal shock and vibration very well.

Electrodeless lamps provide engineering flexibility. Lamp geometries are not fixed in size and shape, and can easily be adjusted to conform to the needs of difficult applications. Among these are applications such as treatment with ultraviolet light in polymer curing operations and in water treatment. Though in the past electrodeless lamps have not generally been used in water purification systems, they can be much better than electrode lamps for this purpose.

In some respects, industry is heavily invested and dependent on using electrode lamps. Because of this, electrodeless lamps have not been used as extensively as they would otherwise have been. The key reasons for this are technical. Electrodeless ultraviolet applications require more sophistication and finesse to engineer than do electrode models. Among the most difficult challenges in using electrodeless lamps is engineering a method for exciting and controlling the output of the lamps. In most cases radio frequency power and coupling systems are used to power the lamps. Lamp geometries, and fill mixes, which are the combination of elements that are excited by an energy source to make ultraviolet light, are engineered to couple with the lamps. In many applications the coupling is achieved, but control of the lamp becomes difficult due to dependence of the coupling on the temperature of the lamps, and the lamps are prone to thermal runaway.

Another problem is that, without special envelope material, in many applications electrodeless lamps produce large amounts of ozone. Ozone can be hazardous to man and machine and should be tightly managed.

Among these problems the chief reason that electrodeless lamps are not used more is that they are extremely difficult to manage and control. In radio frequency applications as an electrodeless lamp continues to operate, it couples more and more strongly with and draws more and more energy from the available radio frequency field, which in turn makes it increase its operating temperature. Subsequently, that causes it to couple more strongly, and it draws more of the available energy. Although this runaway results in more relative ultraviolet output, it also causes the peak wavelength output of the lamp to change because the peak wavelength output of the lamp is dependent on the operating temperature of the lamp. This causes the lamp to be less useful for some applications.

For example, lamps filled with a gas mixture comprising mercury gas and argon gas, the most common fill mix, have not been widely used for water purification because the germicidal bandwidth needed for water purification occurs at about 240 nm (nanometers or $10^{-9}$ meters) to 265 nm wavelength. The problem is that emission of photons at this wavelength range occurs best when the lamp is kept in a temperature range of from about 90° F. (degrees Fahrenheit) to 110° F. Thermal runaway causes the lamp to undesirably exceed this temperature, causing the desired wavelengths to fall off, while other wavelengths, such as those used in some kinds of curing rise dramatically. The peak emission wavelength usually rises to about 360 nm. Such a wavelength is good for curing some kinds of polymer compositions but is not good for killing water borne bacteria. This lack of lamp output stability at the germicidal wavelengths has prevented this technology from being developed for various uses requiring specific output wavelengths. This is true for uses such as water purification, and a method for controlling the characteristic thermal runaway is needed.

BRIEF DESCRIPTION OF THE INVENTION

A method is provided for controlling the photonic output of an electrodeless lamp excited by an energy source outside the lamp. The method comprises passing a fluid over the surface of the electrodeless lamp and controlling the temperature of the fluid to regulate the operating temperature of the lamp. When the temperature of the electrodeless lamp is controlled, the photonic output of the lamp is maintained within a desired range of wavelengths that are dependent on the operating temperature of the lamp.

A water purification system for making potable water is provided comprising an electrodeless lamp excited by an energy source outside the lamp. A layer of water that is to be treated is allowed to flow over the surface of the lamp to expose the water to the output radiation of the lamp. Temperature control of the lamp is accomplished using the flowing water to maintain the temperature of the lamp. By controlling the temperature of the electrodeless lamp the wavelength of the lamp output can be held to germicidal wavelengths to germicidally treat the water flowing over the lamp.

An electrodeless lamp for treating fluids with radiation from the lamp is constructed. The lamp has a first end and a second end and is comprised of an inner tube and an outer tube. The inner tube and the outer tube are joined at the first end and at the second end to form an annular envelope with a continuous outer surface for containing a gas excitable from outside the envelope. The envelope so formed provides an axial channel for passing a fluid through the inner tube exposing the fluid to radiation from the lamp. The lamp also permits fluid to be passed over the outer tube exposing the fluid to radiation from the lamp.

A water purification apparatus for actinically treating water for potability is provided. It comprises a tubular manifold having a closed end and an open end and an electrodeless lamp having an annular shape with a central channel for passing water through the channel. The lamp is mounted inside the manifold to allow water to pass over the outside of the lamp and through the channel of the lamp. On the open end of the manifold a header is attached. The header has a water inlet, a water outlet, and a seal at the end of the lamp adjacent the header to prevent water passing through the channel from mixing with water passing over the outside of the lamp. The apparatus allows water to flow through the manifold such that it passes through both a space between the outside of the lamp and the inside of the manifold and through the channel of the lamp. An energizing source external to the lamp excites the lamp to radiate ultraviolet light.

DETAILED DESCRIPTION OF THE INVENTION

A method for controlling the peak output wavelengths of electrodeless lamps and maintaining them at desired wavelengths indefinitely is described. The method extends across the spectrum of electrodeless lamp output wavelengths.

A significant discovery for water purification, the invention also permits uses of electrodeless lamps in curing and hazardous material remediation applications where they previously were not viable. For example, many polymer systems are engineered to cure with light centered at a wavelength of about 254 nm (nanometers) and spanning a wavelength of from about 240 nm to about 265 nm, which is also the best germicidal frequency for treating water. In many industrial applications ordinary electrode lamps are used for the ultraviolet curing source because they are more easily controlled than are electrodeless lamps and do not runaway thermally as do electrodeless lamps. Using the invention an electrodeless lamp can now reach and maintain the 254 nm wavelength range without runaway. Because of the additional power possible with electrodeless lamps over electrode lamps, curing operations can be sped up by as much as a factor of 4.

An additional benefit is that the invention provides a method for controlling and even preventing the production of ozone by an electrodeless lamp. This eliminates ozone control by such procedures as doping the quartz comprising the envelope that forms the lamp. Controlling ozone generation can also eliminate ventilation requirements. However, in certain applications it is desirable to create ozone for treating water or for other processing purposes.

Electrodeless lamps are usually, but not always, comprised of a quartz envelope filled with a gaseous fluid. Often mixes of gasses are used in the envelope. Commonly, mercury gas is used and is mixed with argon gas and sometimes small amounts of other gases. In operation the gases are usually radiationally excited, often by a nearby radio frequency field, which can be created by various methods such as by a magnetron often similar to that used in a microwave oven. The excited gas in the envelope, experiencing elevated electronic states, emits photonic energy at specific wavelengths as it tries to return to its unexcited state. The specific frequencies emitted are generally dependent on the particular gas or gas mixture used in the envelope, the level of excitation, and the temperature.

In the case of electrodeless lamps when operated in open air, the radio frequency field often couples with the gas in the lamp, and as the temperature rises due to the absorption of radio frequency energy by the gas, the gas reaches a continuously more easily excited state causing the temperature of the lamp to rise in an uncontrollable manner. It is difficult to control this runaway temperature by controlling the energy output of the exciting field since the field couples more and more strongly to the gas with temperature and in a nonlinear fashion. Various methods have been tried to control the thermal characteristics of electrodeless lamps such as rotating the bulb or blowing air on it. These methods work where light output is the only requirement from the lamp, but they do not work well where a specific range of wavelengths is desired that is variable according to temperature.

Figure 1:
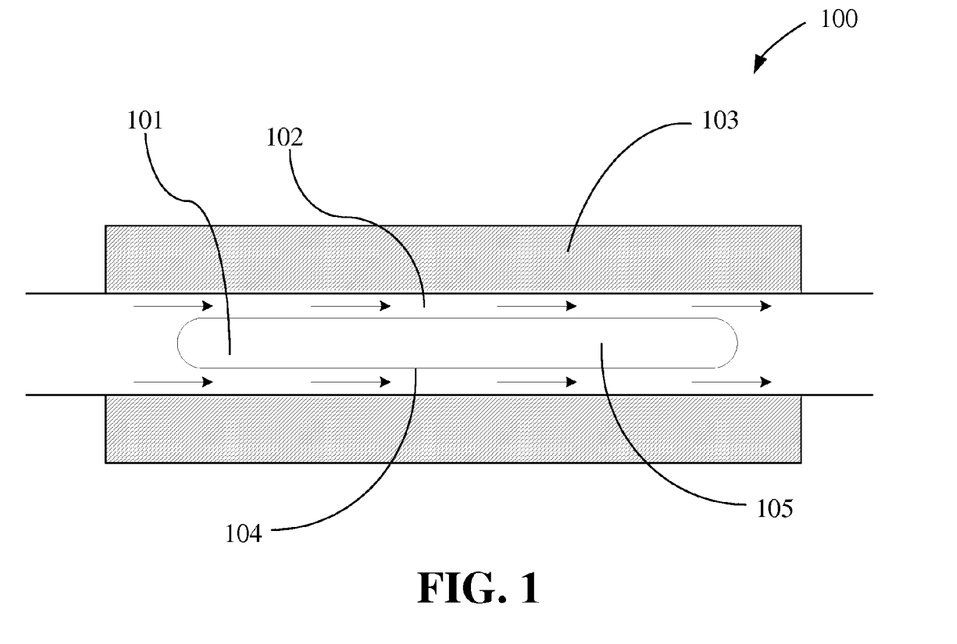
FIG. 1 is an electrodeless lamp control apparatus.

As shown in FIG. 1, a better method for controlling the photonic output of an electrodeless lamp assembly 100 excited by an outside energy source 103 is to pass water or some other temperature stabilizing fluid 102 over the surface of the lamp 104 causing the temperature of the lamp 101 to be limited by the fluid 102. Stabilizing the temperature of the lamp 101 by passing the fluid 102 over its surface 104 allows more flexibility in managing power input to the lamp from the energizing field 103. The stabilization allows greater amounts of energy from the field 103 to be applied to the lamp 101 without causing thermal runaway, and the energizing source can be used in combination with the flowing fluid 102 to control the performance of the lamp 101.

Water makes a suitable fluid 102 for such a purpose because it is a simple matter to control the lamp 101 temperature by adjusting the temperature and flow rate of the water as it is exposed to the lamp surface 104. When the temperature of the water is adequately controlled, the lamp 101 can be made to operate at a specific output range of wavelengths. For example, with an electrodeless lamp 101 filled with a gas 105 mix comprising argon and mercury, and regulated to hold at about 90 F (degrees Fahrenheit) to about 110 F during excitation, the lamp 101 peak output will be centered on about 253.7 nm (nanometers) wavelength and will maintain this ultraviolet wavelength peak so long as the temperature of the lamp 101 is held steady. As it turns out, the wavelength range centered on about 253.7 nm is particularly effective in the germicidal treatment of water, and radiation centered on wavelengths surrounding 253.7 nm are known as the germicidal wavelengths. This particular wavelength is also particularly effective in the curing of certain polymer compounds.

In one embodiment a difficulty with this approach, when radio frequency energy is used, is the problem of passing the radio frequency energy through the fluid 102, water in this embodiment, to the gas 105 since the lamp surface 104 is covered with water and the water tends to reduce the energy delivered to the lamp 101. To improve energy delivery to the gas 105, the depth of the water passing over the lamp 101 is controlled. It is noted that increasing the power output of the outside energy source 103, in this embodiment a magnetron, can allow the use of greater depths of water according to the power requirements needed to start and run a particular lamp 101.

In another embodiment it is possible to better regulate the energy coupling between the gas 105 and the energy source 103 since the water flowing over the lamp 101 acts as a buffering load on the, in this embodiment, radio frequency energy and makes the gas 105 response to changes in the excitation energy provided to the lamp 101 less sensitive to changes in radio frequency energy output. The flowing fluid 102 can absorb some of the energy from the radio frequency field effectively damping the radio frequency energy as it couples with the gas 105 in the electrodeless lamp 101. In this sense the flowing fluid 102 buffers the load on the radio frequency field. Since in some applications variations in output from an excitation source are possible only in discrete steps, the flowing fluid 102 can be used to help with control of the excitation energy reaching the gas 105 in the lamp 101.

In another embodiment it is possible to control the temperature of the fluid 102 using the lamp 101 and the external excitation source 103, also referred to as the energizing source 103, individually or in combination. In this embodiment a radio frequency source can be used. When fluid 102 is not flowing past the lamp 101, it is not always desirable to energize the lamp 101 for various reasons including, but not limited to, energy conservation. A problem can arise in restarting the lamp 101.

When the temperature of the fluid 102 surrounding the lamp 101 falls below the needed operating temperature of the lamp 101, the gas 105 in the lamp 101 is warmed to some minimum ignition temperature before the lamp 101 can be lit. Further, if the system providing the temperature regulating fluid 102 is cold, it can take time to bring the whole system 100 up to operating temperature and ignite the lamp 101. In this context the word ignition refers only to achieving conditions for and lighting the lamp and not to any kind of combustion, since the lamp operates based on the excitation and de-excitation of the gases contained therein.

In systems 100 where the output of the lamp 101 is immediately needed at some specific temperature related wavelength, the warm-up time can be a problem. For example, in one embodiment where the fluid 102 flowing past the lamp needs to be treated by the lamp 101 output, the lamp 101 should be on as soon as the fluid flow starts, or the initial fluid 102 flowing past the lamp 101 will not receive the needed treatment.

To solve this problem, if the fluid 102 surrounding the lamp 101 is kept at the needed ignition temperature for the lamp 101, even though the fluid 102 flow stream external to the lamp system 100 is at a low temperature, the lamp 101 can be instantaneously lit because it is at operating temperature. One feature of electrodeless lamps 101 is that although they need to be at operating temperature for ignition, they will remain in a lit state even though the temperature of the surrounding fluid 102 drops temporarily. Further, they are slow to respond in terms of wavelength output change when they encounter temporary drops in flowing fluid 102 temperatures.

Because of the above, rapid ignition capability can be achieved in electrodeless lamps 101 by regulating the fluid temperature surrounding the lamp 101 to the needed operating temperature, which depends on the gas 105 used in the lamp 101 and the wavelength output desired from the lamp 101.

Fluid based temperature control can allow power input to the lamp 101 from the energizing field 103 to be more easily regulated without causing thermal runaway permitting lamp 101 output to be controlled by the combination of power input to the lamp 101 from the energizing field 103 and temperature control by the fluid 102 surrounding the lamp 101.

In the embodiment where the lamp gas 105 is primarily comprised of argon and mercury, and the fluid 102 surrounding the lamp 101 is water with a desired lamp 101 output centered on about 253.7 nm, maintaining the water surrounding the lamp 101 at a temperature of from about 85° F. to about 100° F. provides rapid ignition of the lamp 101 with the desired output wavelengths.

In another embodiment the lamp 101 and system 100 can be turned off and allowed to come to ambient temperature. When this occurs, treatment of the fluid 102 surrounding the lamp 101 can only be accomplished if the fluid 102 flow is stopped and blocked from passing the lamp 101 while the lamp 101 is off; the energizing source 103 warms the fluid 102 and the lamp 101 up to ignition temperature; the lamp 101 is lit; and fluid 102 flow is then established.

From another aspect one of the negatives of using electrodeless lamps 101 is that they produce ozone from the interaction of the outside surface of the lamp 101 with the atmosphere. When water is used as the fluid 102, the water flowing over the surface of the lamp 101 inhibits the reaction of the lamp surface 104 with the oxygen in the atmosphere substantially eliminating the lamp 101 as a significant source of ozone and removing any ozone created by the interaction with the water as the water flows past the lamp surface 104. Commonly, when the lamp surface 104 is comprised of quartz as is often the case, specialized treatment of the quartz envelope surrounding the lamp 101 is required to limit ozone production. The flowing water can eliminate this requirement.

Figure 2:
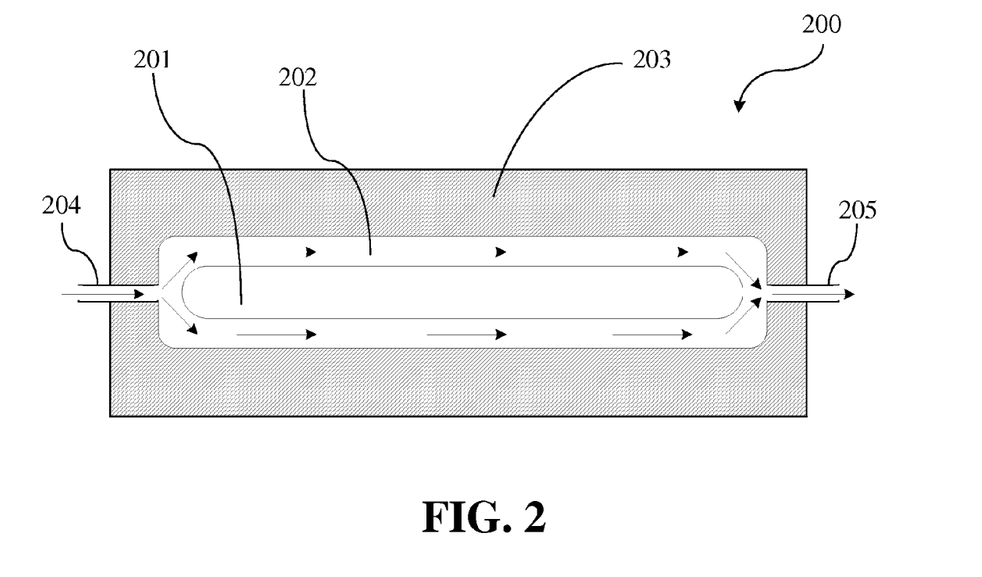
FIG. 2 is a fluid treatment apparatus.

In another embodiment FIG. 2 shows how a system 200 can be used to provide treatment of the fluid 202 flowing over the lamp 201 with the photonic radiation produced by the lamp 201. In the case where the fluid 202 is water, the system is useful in creating potable drinking water. FIG. 2 shows a treatment system 200 that can be used for treating fluids wherein a fluid inlet 204 provides fluid 202 for treatment, the fluid 202 is exposed to the radiation from the lamp 201, which is excited by the energy source 203. As it passes through the system 200, the fluid is exposed to the lamp 201 radiation and the treated fluid exits the system through outlet 205.

Figure 3A:
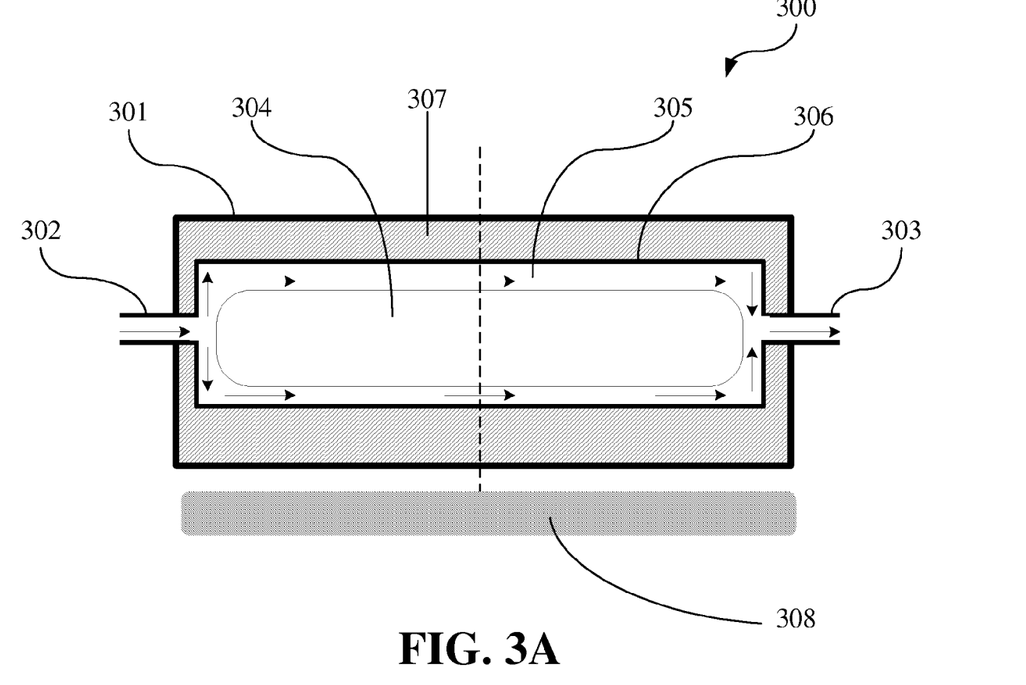
FIG. 3A is an apparatus for irradiating an external target.
Figure 3B:
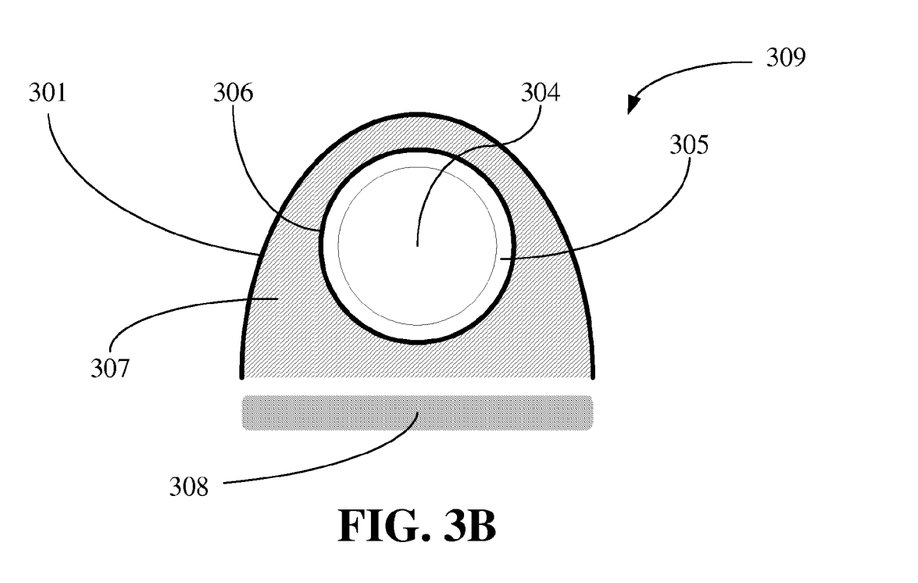
FIG. 3B is an apparatus for irradiating an external target.

FIG. 3A shows another embodiment comprising an electrodeless lamp system 300 employing a photo-transparent shell 306 containing a fluid 305 and a lamp 304 surrounded by an energizing field 307. The photo-transparent shell 306 could be transparent to a broad range of wavelengths or could be constructed or tuned to filter specific wavelengths of light produced by the lamp 304. The field 307 is provided by an external energizing source such as a magnetron. The system 300 has a fluid inlet 302 and a fluid outlet 303 that permits fluid to pass through the system 300. Irradiation of a target 308 outside the lamp 304 and flowing fluid 305 is accomplished by controlling the depth of the fluid 305 to allow the electrodeless lamp 304 output to substantially pass through the fluid 305 and photonically interact with an external target 308. A reflective energy shield 301 is used to direct the energy of the system 300 toward a target 308. The cross section view 309 designated in FIG. 3B is taken through the middle of the apparatus 300 of FIG. 3A as indicated depicting how the photonic output of the lamp 304 passes through the fluid 305 and the energizing field 307 to illuminate the target 308.

In this case the flowing fluid 305 stabilizes the output of the lamp 304 and provides a stable and precise source for ultraviolet radiation. Such sources are particularly useful in treating targets 308 that are sensitive to particular photon energies. One example is in the curing of polymeric compounds which are often only sensitive to a particular photon energy associated with the activation of chemical processes that occur in these materials.

Figure 4A:
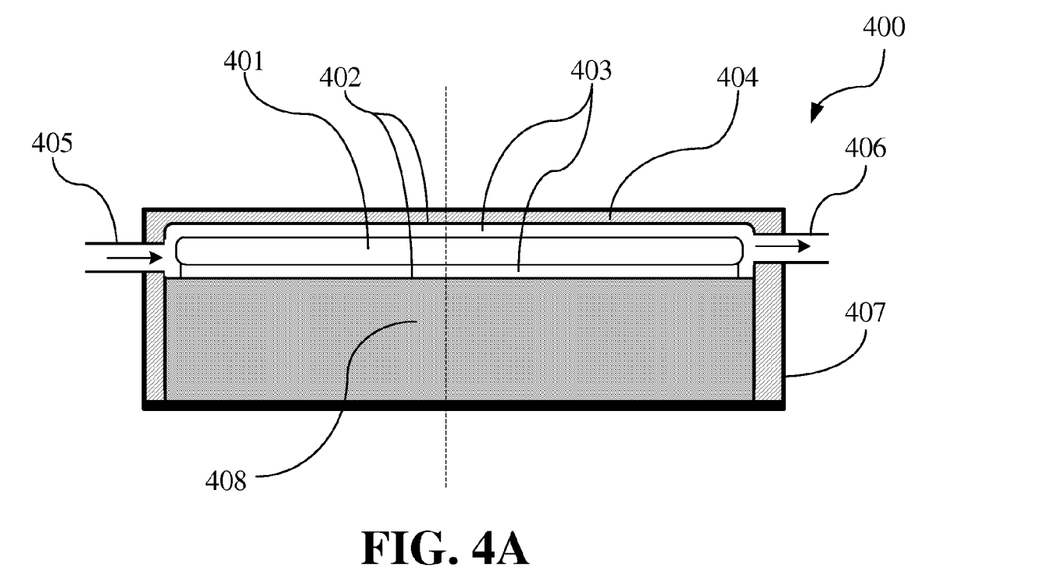
FIG. 4A is an apparatus for conforming to the shape of a target.
Figure 4B:
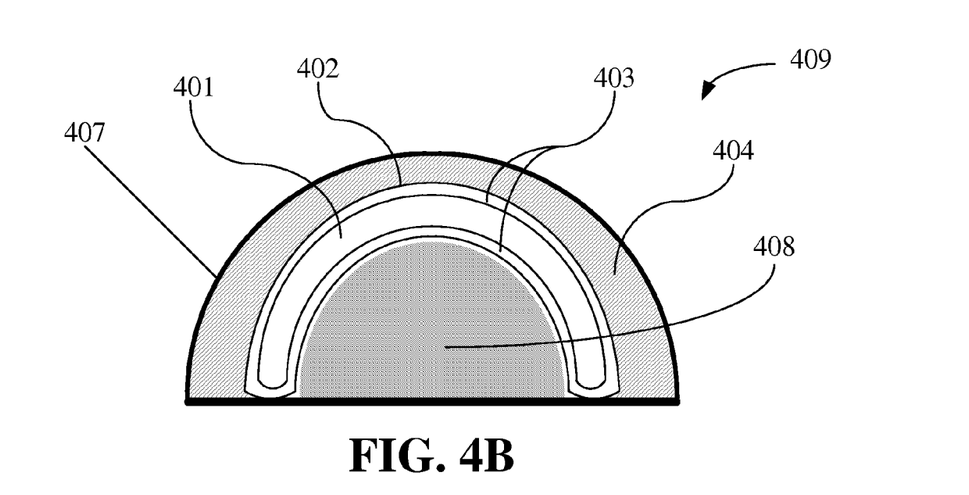
FIG. 4B is an apparatus for conforming to the shape of a target.

FIG. 4A and FIG. 4B portray another embodiment showing how a system 400 can be built to conform to the shape of a target 408 for irradiating it with ultraviolet radiation. FIG.

4A is a cross section side view of the system 400 in which the electrodeless lamp 401 is deformed to focus its output radiation. In FIG. 4A the jacket 402 around the flowing fluid 403 contains the entire lamp 401. However, the lamp 401 is not exposed on every side to the excitation energy field 404 provided by an outside excitation source. Fluid still flows around the lamp 401 from inlet 405 to outlet 406 for regulating the temperature of the lamp 401, and the exposure of the lamp 401 to the exciting field 404 is sufficient to ignite the lamp 401 and keep it lit while the flowing fluid 403 regulates its temperature. The advantage of the arrangement shown 400, 409 in FIG. 4A and FIG. 4B is that except for the thin temperature controlling layer provided by the flowing fluid 403, the lamp 401 can be exposed directly to the target 408 and can be conformed to fit the target 408. The cross end view 409 of FIG. 4B taken as indicated in FIG. 4A shows this.

In this embodiment the arched nature of the lamp 401 along its long axis allows the lamp to conform to the target 408 shape shown. The apparatus 400, 409 can be incased in a reflective energy shield 407 which contains the energizing field 404 and reflects it internally to the lamp 401, and the shaped nature of the lamp 401 permits three dimensional treatment of the target 408.

In FIG. 4B a gap is shown between the target 408 shape and the inner side of the fluid flow channel for reasons of clarity. In use this gap can be eliminated and the jacket 402 comprising the outside of the temperature regulating fluid 403 channel can be placed in contact with the target 408. Such an arrangement can lead to added robustness of an operating system 400, 409 adding to mechanical stability while enhancing the level of radiation delivered to the target 408 and providing a three dimensional nature to the treatment of the target 408.

The purification of water can be accomplished by passing water over an electrodeless lamp as discussed above. However, to provide adequately treated water certain minimum amounts of ultraviolet energy have to be delivered to the water. Further, the energy has to be delivered in a manner that will insure that the radiation can interact with the polluting bacteria.

Ultraviolet wavelength treatment methods sometimes are defeated by the phenomenon of shadowing. Shadowing occurs when intervening matter gets between the ultraviolet source and targeted matter interfering with the photons reaching the targeted matter. When fluids are being treated, this problem can be addressed by various methods such as introducing turbulence into the fluid flow stream. However, the following embodiment has been found to be effective in delivering the needed radiation permitting the treatment of solid objects as well as fluids. While the embodiment can be used to treat fluids, it can also be used to treat other items such as medical instruments, food, or other articles with electrodeless lamp produced radiation. The embodiment permits 360 degree radiation exposure over an extended length to a target region.

Figure 5A:
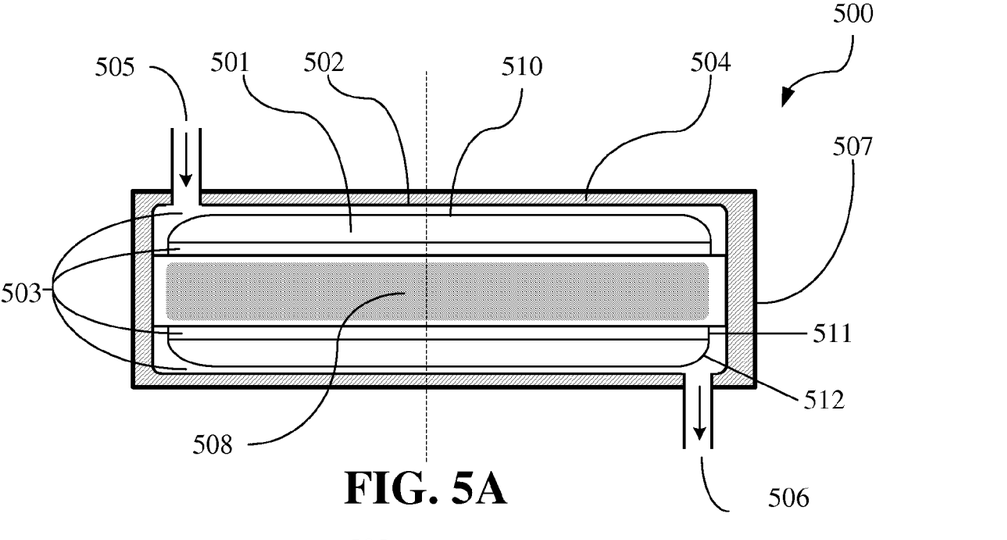
FIG. 5A is an apparatus for enhancing radiation delivery.

To provide the needed ultraviolet dose delivery FIG. 5A shows a cross section of an electrodeless lamp 501 system 500 formed in the shape of an elongated annular ring with the lamp surface 510 continuous and enclosing an excitable gas.

Figure 5B:
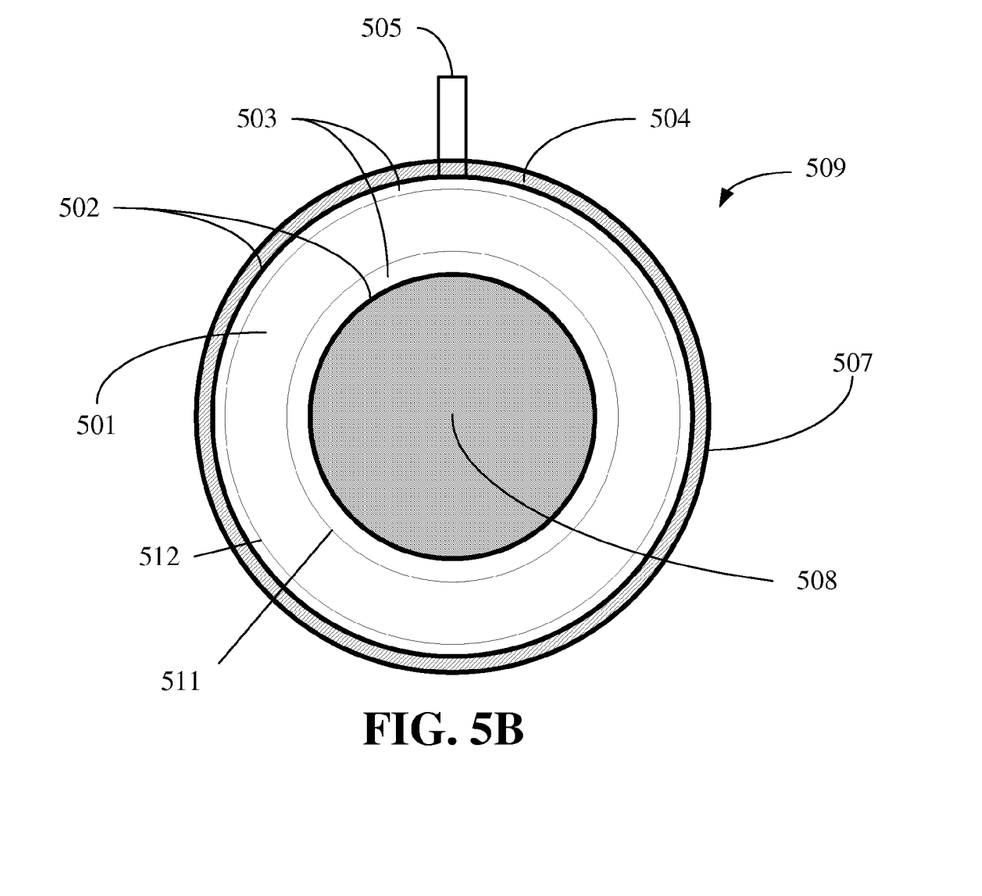
FIG. 5B is an apparatus for enhancing radiation delivery.

FIG. 5B is a cross section view 509 of the apparatus 500 as seen through the indicated plane looking down the length of the tube to the left showing the inlet 505 at the far end of the apparatus.

The system is fitted with an inlet 505 and an outlet 506, is enclosed in a reflective energy shield 507, features an excitation energy field 504 provided by an external excitation energy source, not shown, and is contained by the reflective energy shield 507.

The lamp envelope 510 enclosing the lamp's gas is comprised of an inner tube 511 and an outer tube 512 joined at the ends to form the annular ring. Usually, the tubes 511, 512 forming the annular shaped electrodeless lamp 501 are round, though they need not be and in some embodiments are not. The interior of the lamp 501, between the tubes 511, 512 of the envelope 510, is filled with a radiation producing gas and is excited by an external energy field 504 which is produced by an external energy source.

The shape of the electrodeless lamp 501 provides an axial channel 508. The system 500 is configured to allow a temperature stabilizing fluid to flow over the lamp surface passing a fluid 503, such as water, through the space between the inner photo-transparent shell 502 and the inner tube 511 and also through the space between the outer tube 512 and the outer photo-transparent shell 502. The fluid stabilizes the operation of the lamp preventing thermal runaway and allowing selection of output wavelengths from the lamp 501 by controlling the temperature of the lamp. In this configuration the lamp can deliver enhanced doses of radiation. As material is moved through the channel 508 it is bombarded with the radiation from a full 360° and further benefits from axial scattering effects as the discharging gas in the lamp radiates through the inner portion of shell 502 delivering a shadow defeating dose of radiation. As discussed above, the flowing fluid 503 is maintained at a temperature and flow rate that insures that the lamp 501 is kept at the temperature needed to maintain its peak radiation output in the desired range.

The physical size of the channel 508 can be changed to accommodate varying needs for dosing the material that is passed through the channel 508, and the material treated by the apparatus can comprise solid objects or fluids.

In one embodiment the shape of the lamp 501 can be flattened along the axial channel 508 so that the depth or thickness of the channel 508 is decreased and the effective energy density of radiation delivered to the material passing down the channel 508 is increased. The rest of the apparatus is modified to accommodate the lamp shape when this is done.

Though ultraviolet wavelengths are the ones generally desired for actinic water processing using electrodeless lamps, other gas mixtures than ultraviolet producing gas mixtures and their associated wavelengths can be used for other processing purposes. As discussed above, when the radiation desired is ultraviolet radiation, the ultraviolet producing gas mixture is often comprised of mercury and argon and is held at a specific temperature to produce peak output from the lamp at germicidal wavelengths.

In yet another embodiment stabilizing by liquids passing over the lamp solves another problem characteristic of electrodeless lamps. The presence of the fluid inhibits the exposure of the lamp envelope to free oxygen in the open atmosphere and limits the production of ozone from the lamp surface sweeping away any ozone that is created from the presence of free oxygen in the fluid. In this way the fluid passed over the surface of the lamp is used to control ozone production at the surface of the electrodeless lamp.

Figure 6A:
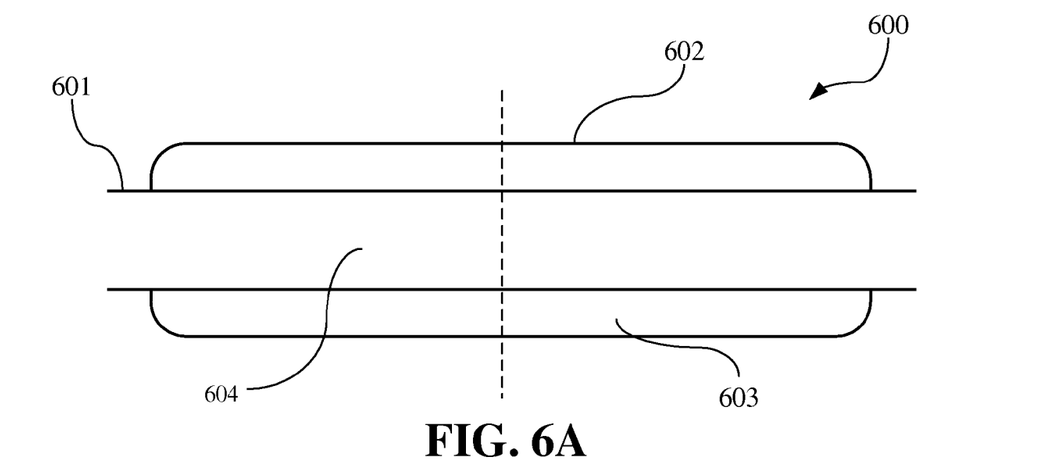
FIG. 6A is a treatment apparatus.
Figure 6B:
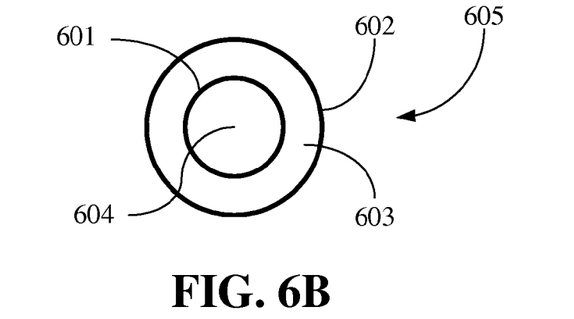
FIG. 6B is a cross section of a treatment apparatus.
Figure 6C:
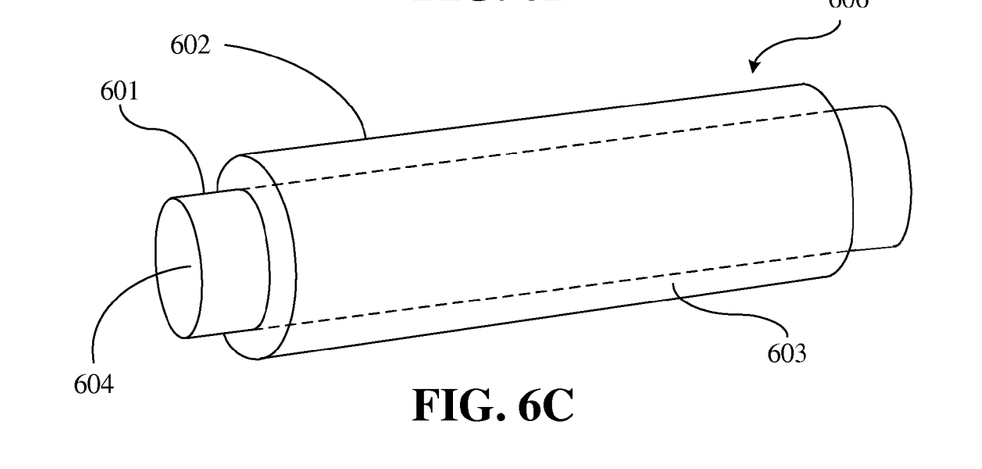
FIG. 6C is a treatment apparatus.

In another embodiment FIGS. 6A, 6B and 6C show how axial flow down an annular shaped electrodeless lamp can be made into a treatment apparatus 600 for stabilizing electrodeless lamp operation to provide desired wavelengths from the lamp and at the same time provide effective fluid treatment with minimal shadowing. For radiation transmission purposes various materials can be used to form the sides of electrodeless lamps depending on the radiation transmission needs. As mentioned above, where water is being purified using electrodeless lamps and the gas in the lamp comprises mercury and argon, the lamps are usually made of quartz. As shown in FIG. 6A, a lamp 600 comprised of quartz can be fabricated by using an inner tube 601 and an outer tube 602 joining them together to form a gas filled envelope 603 to provide the axial channel 604.

FIG. 6B shows a cross section 605 through the indicated plane and looking down the length of the apparatus 600, and FIG. 6C is a perspective view 606 of the apparatus.

In use a temperature stabilizing fluid can be passed over the surfaces of the envelope to control the temperature of the lamp 603 created by joining the end of the outer tube 602 with the inner tube 601 to form the lamp 603. In this embodiment the fluid passed over the lamp is treated with the radiation from the lamp at the same time that it is stabilizing the temperature of the lamp. For example, the apparatus can be the core of a water treatment system.

While the lamp geometry allows for greatly increased surface area for production of desirable photonic wavelengths. It is desirable to maintain the thickness or distance between the inner tube 601 and the outer tube 602 at less than about 13 mm (0.51 inch). This reduces self-absorption of desirable photons which occurs when the photons interfere with each other inside the envelope.

If more output energy or photons are needed, one can increase the diameter of the inner and outer lamp walls to further increase surface area for photonic output, while still maintaining an about 13 mm (0.51 inch) annular envelope thickness. Increasing the thickness of the annular envelope does not proportionally increase photonic output levels.

Figure 7:
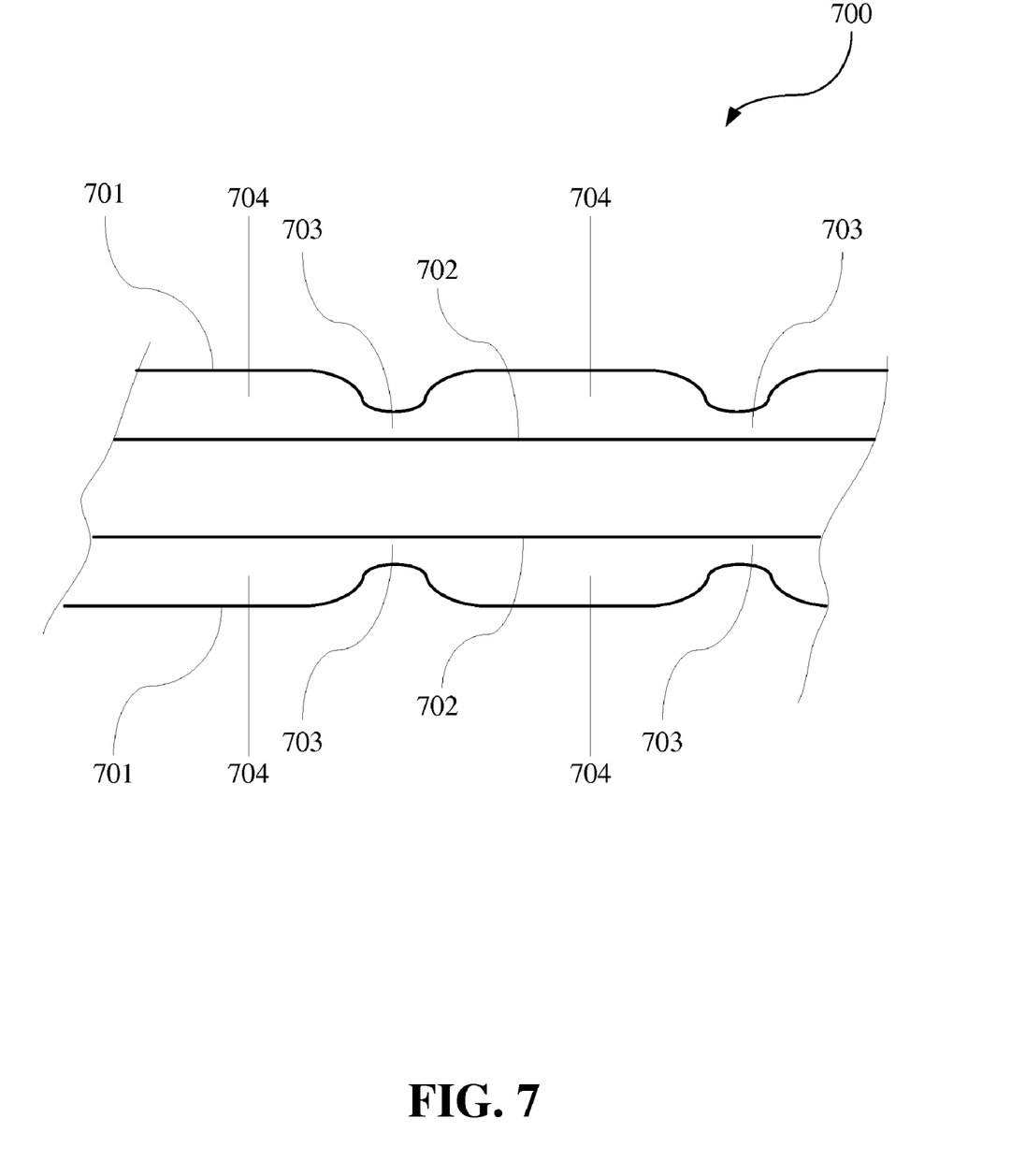
FIG. 7 is a lamp segment with variable thickness sides.

In another embodiment as shown in FIG. 7, the thickness of the sides of the annular envelope can be varied. FIG. 7 is a section of an annular envelope 700 shown in section cut along the axis of the envelope. In the drawing the outer tube 701 appears folded to vary the thickness of the annular envelope 700 along the length of the lamp thus controlling the plasma flow and energy distribution throughout the lamp. Combinations of lamp length and annular region thickness along the length of the lamp can be used to optimize the lamp's performance with regard to radio frequency power source frequency and desired photonic output and intensity. Additionally, varying the annular region thickness, as shown in FIG. 7, provides additional surface area, further promoting the production of photons at desirable wavelengths and substantially limiting self-absorption.

To maximize the efficiency of output as discussed above it is best to maintain the distance between the inner and outer tube at less than about 13 mm (0.51 inch). However, the pinching effect of the thinner regions 703 along the envelope 700 cause intense ultraviolet output associated with the thinner regions 703. There are numerous occasions when such intense localized output can be advantageous.

In one example the distance between the pinched regions 703 can be reduced so that there are many pinched regions 703 close together along the length of the tube providing relatively intense ultraviolet output. An envelope 700 made in this way can be useful in polymer curing operations or when the purpose of the tube is to maximize ozone output.

If only the regions of intense ultraviolet output 703 are desired, one can make the thickness of the envelope between the pinches 704 arbitrarily large. This has the effect of increasing the relative output of the pinched regions 703 by keeping energy in the envelope 700 where it is thick 704 because of self absorption in those regions while making that energy available to the thinner regions 703 for relatively efficient photon emission.

To make the discussion simpler FIG. 7 has shown only the outer tube folded. However, either or both of the tubes 701, 702 could be folded to make pinched regions and produce enhanced emission from them.

In yet another embodiment a conductive wire or wires can be inserted within the annular envelope of the lamp disposed along the length of the lamp. For example, a filamentary piece of tungsten wire could be used. A current can be induced in the wire as energy is delivered to the wire by the radio frequency energy power source. The wire carries this energy along its length for distribution to the plasma field. The wire also provides thermal energy to provide sufficient heating of the fill to keep it in a gaseous state. This is particularly useful when operating the lamp in cool or cold environments where sufficient power to start the lamp is otherwise unavailable. The length of the wire can be varied to tune it to the specific radio power frequency needed for optimizing current inducement in the wire.

In an exemplary embodiment a 20" lamp, similar to the lamp of FIG. 6, can use a tungsten wire of about 0.020" diameter (for mechanical strength) and a length of about 9.9" when powered by radio frequency energy at about 2.5 GHz. However, the length of the wire can be varied by multiples of 31.43 mm +/−3.175 mm (1.2375 inches +/−0.125 inches) for power sources generating radio frequency energy at about 2.5 GHz. In other words the length of the wire filament for a 2.5 GHz power source can be as short as 1.2375 inches and as long as a multiple of 1.2375 inches depending on the overall length of the lamp's envelope.

In another embodiment the lamp is energized by a magnetic field. The presence of the wire in the lamp permits an external magnetic field to be much more effectively coupled to the lamp for energy delivery to the gas fill of the lamp than a magnetic field can be coupled to the fill of the lamp without such a wire. For this reason, the presence of the wire permits relatively efficient delivery of magnetic field energy to the lamp exciting the fill within the lamp.

Figure 8:
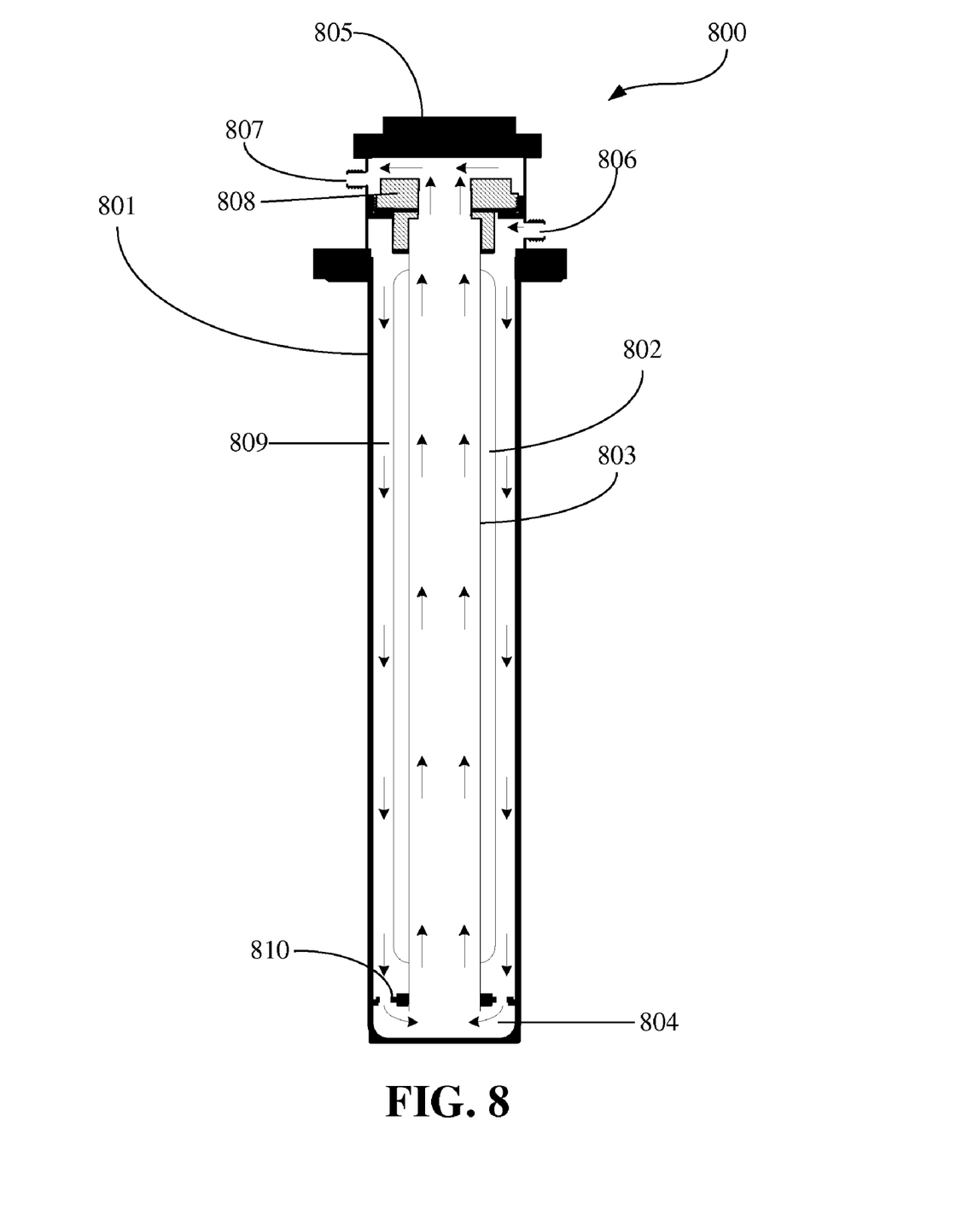
FIG. 8 is an apparatus for treating fluids.

FIG. 8 shows another embodiment using an apparatus similar to that provided in FIG. 6. In FIG. 8 the assemblage 800 is used to provide a water purification apparatus 800 for actinically treating water for potability. A tube shaped manifold or processing chamber 801 open only on one end is used. Inside the manifold 801 is placed an electrodeless lamp 802 that can be, but need not be, centered in the manifold 801. The electrodeless lamp 802 has the annular shape discussed above with a central channel 803 for passing water through the lamp 802. Head space 804 is allowed at the closed end of the manifold 801 allowing water to flow around the end of the electrodeless lamp 802.

A header 805 is attached to the open end of the manifold 801. The header 805 has a water inlet 806, a water outlet 807 and a seal 808 at the end of the lamp 802 adjacent the header 805 to prevent water passing through the channel 803 from mixing with water passing over the outside of the lamp 802.

The apparatus 800 allows water to pass through the manifold 801 such that it passes through both a space 809 between the outside of the lamp 802 and the inside of the manifold 801 and through the channel 803 of the lamp to receive an effective dose of lamp 802 radiation and to keep the lamp 802 at the desired operating temperature to provide germicidally effective radiation.

Figure 9:
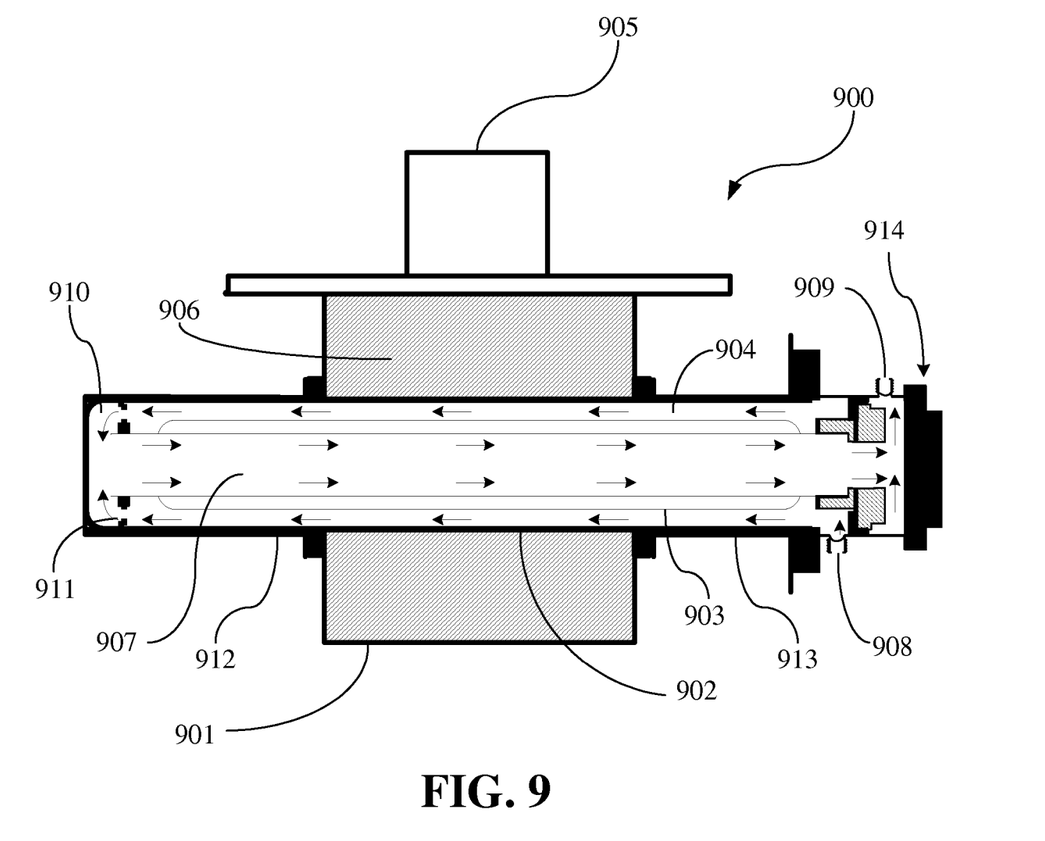
FIG. 9 is an apparatus for treating fluids.

In another embodiment as shown in FIG. 9, an external energizing source 905 is used for energizing an electrodeless lamp 903. The apparatus 900 of FIG. 9 shows a lamp 903 inserted in a microwave tuned cavity 901 which is used for exciting the lamp 903 since it is inside a manifold 902. It should be noted that the excitation energy source 905 does not have to completely enclose the lamp for the lamp to provide desired ultraviolet radiation. A small portion of the lamp 903, when exposed to the exciting energy source, can be effective in lighting or driving the whole lamp 903 and providing ultraviolet radiation from the entire lamp surface.

In operation the water flows into the inlet 908 of the header assembly 914, through either the channel 907 or the side space 904, depending on inlet 908 and outlet 909 arrangement, through the head space 910 and back out through either the channel 907 or the side space 904 depending on inlet 908 and outlet 909 arrangement. As presented in FIG. 9 the water flows in the inlet 908, through the side space 904, then through the channel 907 and out the outlet 909. As indicated above, the flow direction could be reversed. The temperature and flow rate of the water are adjusted externally to maintain the desired peak in electrodeless lamp 903 radiation.

The thickness of the side space 904 is chosen to insure that any needed actinic treatment by the lamp emission in the side space is effective. However in many but not all instances, the high intensity treatment of the water flowing through the channel 907 is sufficient to purify water flowing through the apparatus 900.

The apparatus 900 described can also be used for treating fluids other than water and for purposes other than water purification. For example, a flowing reactionable polymer stream can be partially reacted by choosing and maintaining the appropriate output wavelength from the electrodeless lamp 903. Such treatment could be used to regulate the viscosity of the flowing polymer stream.

It is found that the most effective thicknesses for the side space 904 when using commonly available magnetrons similar to those used in ordinary microwave ovens are up to about 6.35 mm (0.25 inch). Higher power radio frequency sources allow a thicker side space 904 for effective fluid treatment according to the output capabilities of the electrodeless lamp 903 and the requirements of the shadowing situation.

In some embodiments it is desirable to use multiple electrodeless lamps in combination. It should be noted that electrodeless lamps can be grouped and can be driven by other lamps in contact with or close by each other. In this case the excitation source for the electrodeless lamps can be other electrodeless lamps with initial excitation arising from various energy providing sources.

Those skilled in the art will realize that this invention is capable of embodiments different from those shown and described. It will be appreciated that the detail of the structure of this apparatus and methodology can be changed in various ways without departing from the scope of this invention. Accordingly, the drawings and detailed description of the preferred embodiments are to be regarded as including such equivalents as do not depart from the scope of the invention.

I claim:

1. An electrodeless lamp for treating fluids with radiation from the lamp, the tamp having a first end and a second end and comprising an inner tube and an outer tube, the inner tube and the outer tube being joined at the first end and at the second end to form an annular shaped envelope for containing a gas excitable from outside the envelope, the envelope providing an axial channel for passing fluid through the inner tube exposing the fluid to radiation from the lamp, the lamp having a space outside the outer tube for passing the fluid over the outer tube exposing the fluid to additional radiation from the lamp and wherein the axial channel and the space are connected so that the fluid consecutively passes through the axial channel and the space.

2. The electrodeless lamp of claim 1 wherein the radiation from the lamp is at ultraviolet wavelengths.

3. The electrodeless lamp of claim 1 wherein a controller is used to control the temperature of the fluid passing over the lamp in combination with regulating power input to keep the lamp output at germicidal wavelengths.

4. The electrodeless lamp of claim 1 wherein the fluid passed over the surface of the lamp is used to control ozone production at the surface of the electrodeless lamp.

5. The electrodeless lamp of claim 1 wherein the thickness of the annular envelope is less than about 13 min (0.51 inch).

6. The electrodeless lamp of claim 1 wherein the thickness of the annular envelope is varied along the length of the annular envelope to increase the surface area of the envelope for enhancing the photonic output of the lamp.

7. The electrodeless lamp of claim 1 wherein the thickness of the annular envelope is varied along the length of the annular envelope to control plasma flow and energy distribution throughout the lamp when the lamp is energized by an external energy source.

8. The electrodeless lamp of claim 1 wherein the thickness of the annular envelope is varied along the length of the annular envelope to provide regions of enhanced radiation output along the length of the lamp when the lamp is energized by an external energy source.

9. The electrodeless lamp of claim 1 wherein a conductive wire is disposed within the annular envelope of the lamp for receiving and distributing energy from an external energy source.

10. The electrodeless lamp of claim 9 wherein the length of the wire is varied to tune the lamp to a specific radio frequency for enhanced energy transfer to the lamp when the lamp is energized by an external radio frequency energy source.

11. The electrodeless lamp of claim 9 wherein energy is transferred to the lamp by inductively coupling an external magnetic field to the wire.

12. The electrodeless lamp of claim 1 further comprising a head space connecting the axial passage and the space and allowing the fluid to pass around one of the first end and the second end of the envelope between the space and the axial channel.

13. The electrodeless lamp of claim 1 further comprising an energy source located outside the envelope for exciting the electrodeless lamp.

14. The electrodeless lamp of claim 13 wherein the energy source produces a radio frequency field to excite the electrodeless lamp.

15. The electrodeless lamp of claim 13 wherein the energy source is located outside the space so that the energy source transmits energy to the envelope through the fluid passing over the outer tube.

16. The electrodeless lamp of claim 15 wherein the energy source produces a radio frequency field to excite the electrodeless lamp.

17. The electrodeless lamp of claim 1 wherein the fluid is water.

18. The electrodeless lamp of claim 1 wherein the fluid passes passes through the axial channel and the space in opposite directions.

* * * * *